US006296005B1

(12) United States Patent
Williams et al.

(10) Patent No.: US 6,296,005 B1
(45) Date of Patent: Oct. 2, 2001

(54) COLLAPSIBLE BLIND AND DECOY APPARATUS

(76) Inventors: B. Monte Williams; Lincoln Scott Williams, both of 2103 V Rd., Clarks, NE (US) 68628

( * ) Notice: Subject to any disclaimer, the term of this patent is extended or adjusted under 35 U.S.C. 154(b) by 0 days.

(21) Appl. No.: 09/595,917

(22) Filed: Jun. 13, 2000

(51) Int. Cl.⁷ ........................... A01M 31/06; E04H 15/28
(52) U.S. Cl. ............................ 135/901; 135/98; 135/99; 43/1; 43/2
(58) Field of Search ................ 135/901, 98, 99; 43/1, 2; 428/16, 919

(56) References Cited

U.S. PATENT DOCUMENTS

| 3,052,054 | * | 9/1962 | Littleton et al. ............................ 43/1 |
| 3,163,418 | * | 12/1964 | Myers ................................. 429/16 X |
| 4,585,684 | * | 4/1986 | Mackarous ......................... 428/16 X |
| 4,590,699 | | 5/1986 | Nicks . |
| 4,811,956 | * | 3/1989 | Foreman ............................... 273/407 |
| 5,214,872 | | 6/1993 | Buyalos, Jr. . |
| 5,522,168 | | 6/1996 | Friddle . |
| 5,572,823 | | 11/1996 | Savaria . |
| 5,628,338 | * | 5/1997 | Stumbo ............................... 135/901 |
| 5,675,926 | * | 10/1997 | Manka ............................. 135/901 X |
| 5,787,632 | | 8/1998 | Kraut . |
| 5,943,807 | * | 8/1999 | McPherson ................................. 43/2 |

FOREIGN PATENT DOCUMENTS

| 22257 | * | 9/1930 | (AU) ........................................... 43/1 |
| 1081044 | * | 12/1959 | (FR) ..................................... 135/99 |

* cited by examiner

Primary Examiner—Laura A. Callo
(74) Attorney, Agent, or Firm—Henderson & Sturm LLP

(57) ABSTRACT

A collapsible blind and decoy apparatus (10) for attracting wild game wherein the apparatus (10) includes a blind/decoy unit (12) supported by a collapsible framework unit (11). The blind/decoy unit (12) includes a blind/decoy member (50) having a first sheet (51) of material (52) that is at least semi-transparent with a front surface (56) that is provided with an opaque decoy element (55) that is contoured, colored and configured to resemble a selected species of wild game for the purpose of attracting wild game towards the apparatus (10).

20 Claims, 3 Drawing Sheets

COLLAPSIBLE BLIND AND DECOY APPARATUS

BACKGROUND OF THE INVENTION

1. Field of the Invention

The present invention relates to the field of collapsible blinds for hunting in general, and in particular to a collapsible blind whose primary function is to act as a decoy to attract wild game.

2. Description of Related Art

As can be seen by reference to the following U.S. Pat. Nos. 4,590,699; 5,214,872; 5,522,168; 5,572,823; and 5,787,632, the prior art is replete with myriad and diverse hunting blind constructions.

While all of the aforementioned prior art constructions are more than adequate for the basic purpose and function for which they have been specifically designed, they are uniformly deficient with respect to their failure to provide a simple, efficient, and practical collapsible blind construction whose primary function is to provide a decoy for wild game.

As most hunters are aware, the use of decoys for big game animals such as elk and deer is extremely effective; however, the transport of the decoy to a particular site or location can be so difficult and/or cumbersome as to make this task either impossible or impractical for most purposes.

As a consequence of the foregoing situation, there has existed a longstanding need among hunters for a new and improved collapsible blind whose primary purpose and function is to serve as a decoy for wild game, and the provision of such an construction is the stated objective of the present invention.

BRIEF SUMMARY OF THE INVENTION

Briefly stated, the collapsible decoy and blind apparatus that forms the basis of the present invention comprises in general, a framework unit that is collapsible and supports a combined blind/decoy unit.

As will be explained in greater detail further on in the specification, the most important aspect of this invention revolves around the blind/decoy unit which includes a first sheet of at least partially transparent material having a front surface which is provided with an opaque decoy element that is contoured, colored, and configured to resemble a selected species of wild game. The light transmissive properties of the first sheet of material gives a three dimensional appearance to the decoy element such that when transparent material is employed as the first sheet of material, the decoy element will acquire a stand alone visual appearance. When a partially transparent sheet of material is employed as the first sheet of material, any hunter movement that occurs behind the blind/decoy unit will be attributed by an approaching game animal as emanating from the decoy element.

In addition, the framework unit includes a collapsible framework member mounted on a collapsible support shaft member, whereby the support shaft member folds in half and the framework member and the blind/decoy unit are collapsible in a quasi-folding umbrella fashion to facilitate the transport of the apparatus to a desired hunting location.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
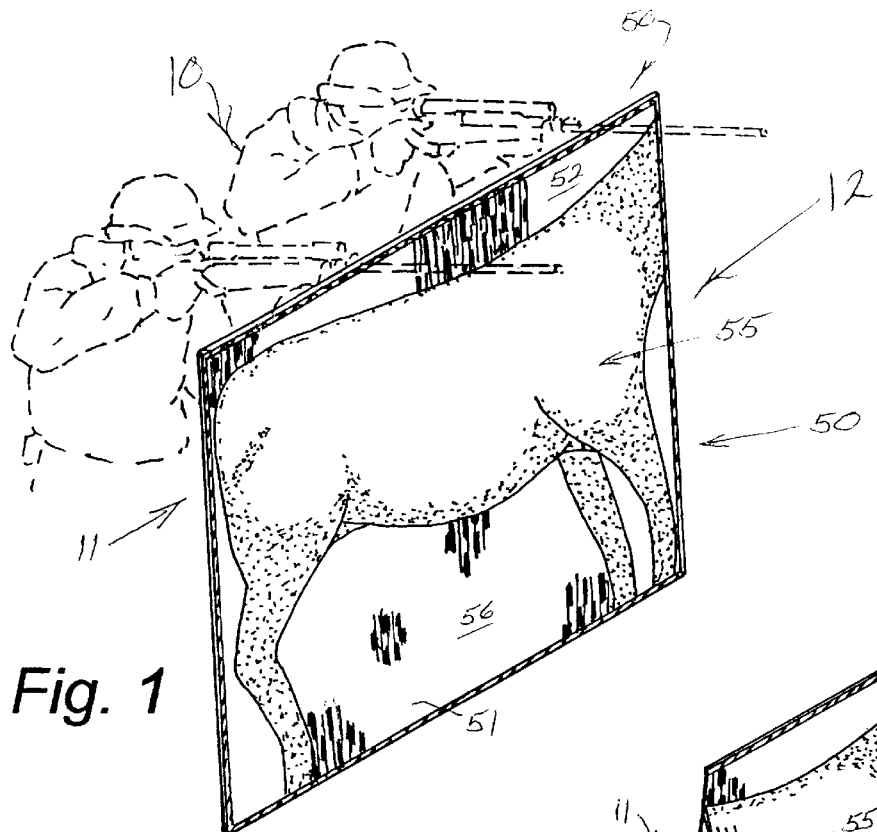
FIG. 1 is a perspective view of the collapsible blind and decoy apparatus that forms the basis of the present invention.
Figure 2:
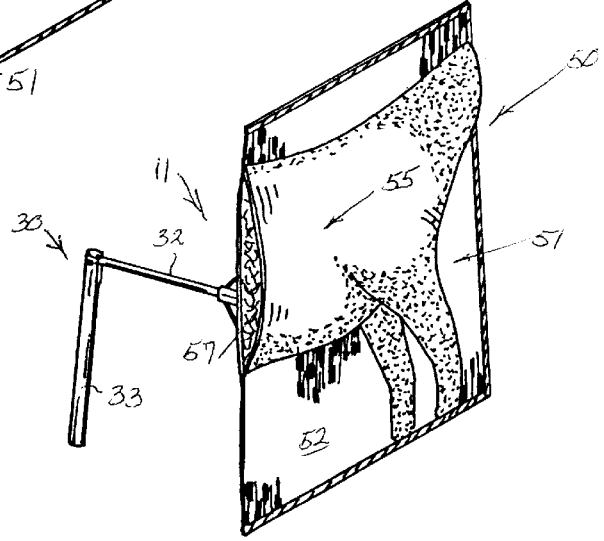
FIG. 2 is a cut away perspective view of a generally two dimensional version of the apparatus.
Figure 3:
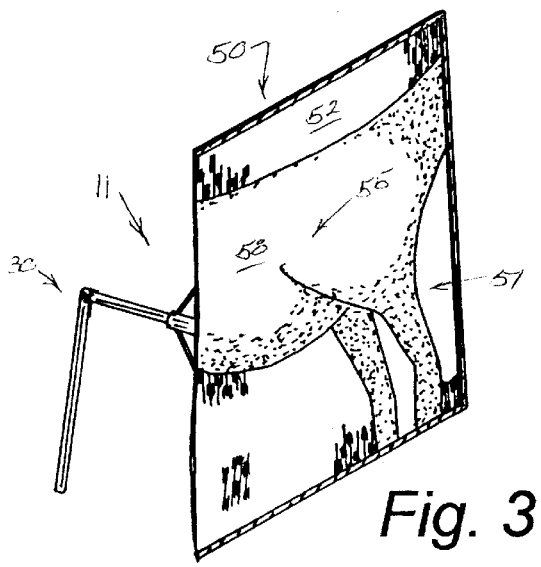
FIG. 3 is a cut away perspective view of a generally three dimensional version of the apparatus.
Figure 4:
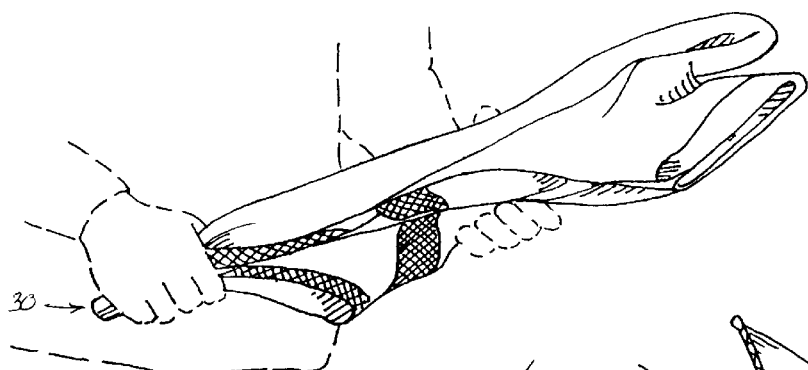
FIG. 4 is a perspective view of the apparatus in the fully collapsed state.
Figure 5:
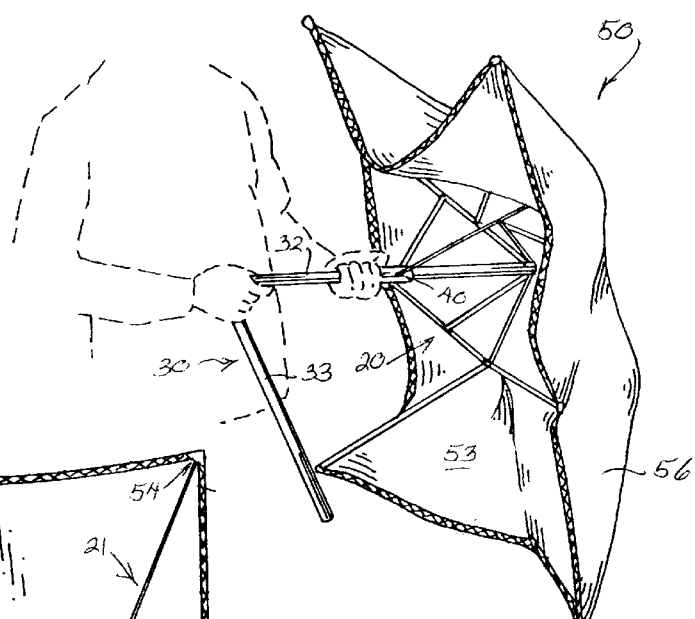
FIG. 5 is a perspective view of the apparatus in the partially erected state.
Figure 6:
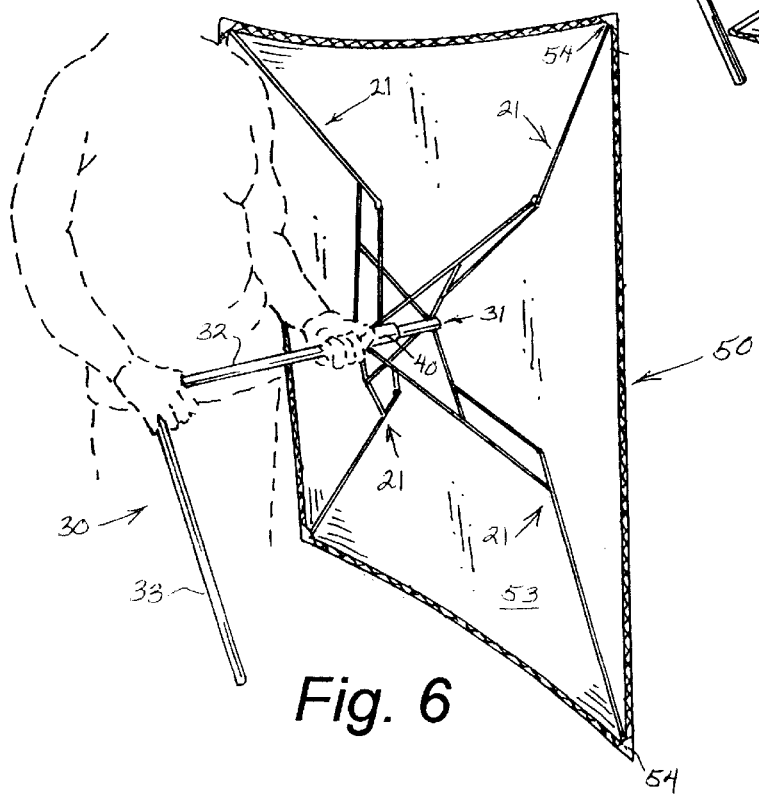
FIG. 6 is a perspective view of the apparatus in the substantially erected state.

As can be seen by reference to the drawings, and in particular to FIG. 1, the combined blind and decoy apparatus that forms the basis of the present invention is designated generally by the reference number 10. The apparatus 10 comprises in general a framework unit 11, and a blind/decoy unit 12. These units will now be described in seriatim fashion.

Figure 7:
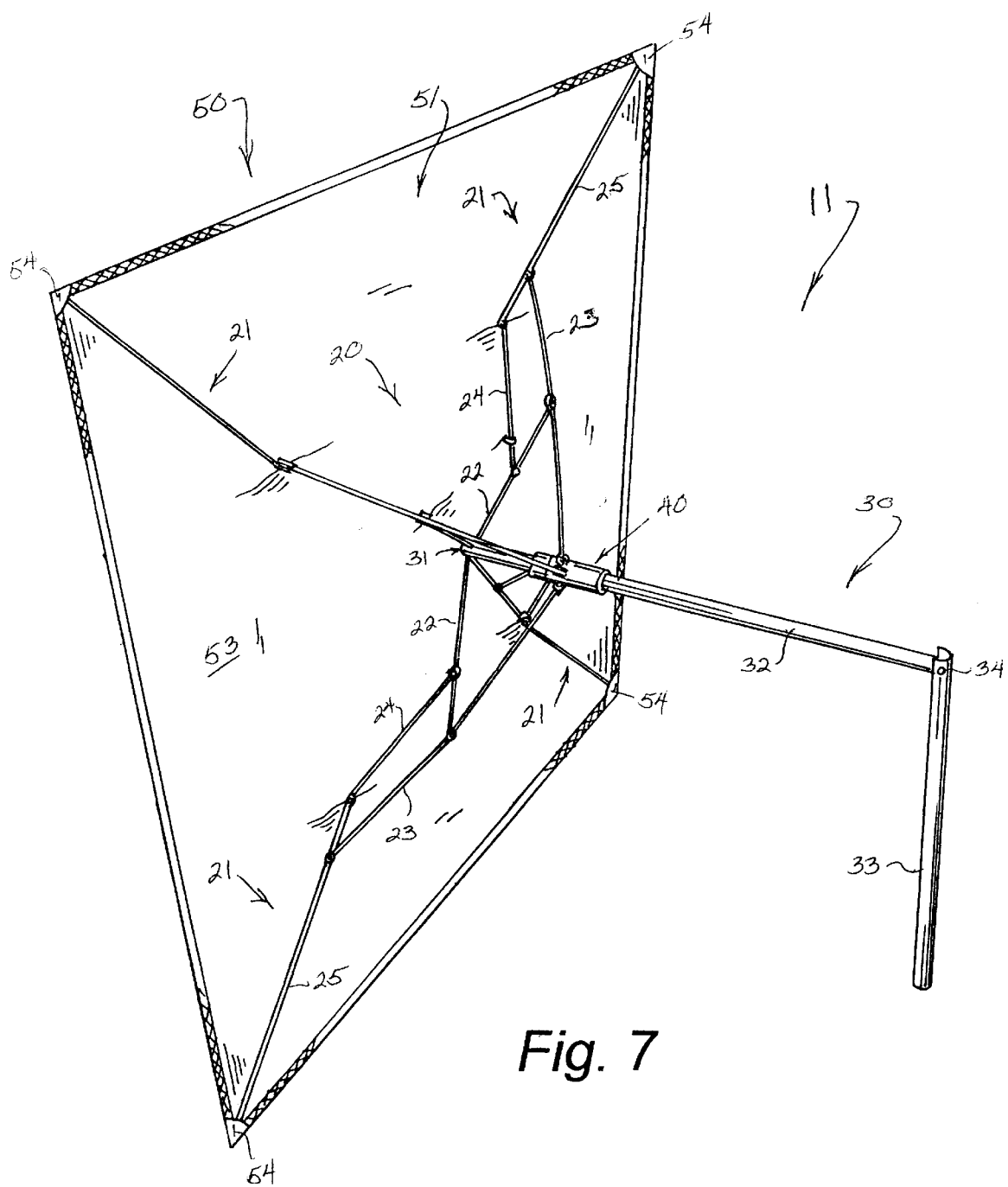
FIG. 7 is a rear perspective view of the apparatus in the fully erected state.

As can best be appreciated by reference to FIG. 7, the framework unit 11 comprises a collapsible framework member 20 having a plurality of articulated support arms 21 that are pivotally connected to both the outboard end 31 of the upper portion 32 of a collapsible support shaft member 30 and the exterior periphery of a slidably collar element 40.

In addition, each of the support arms 21 comprise a plurality of rib elements 22 through 25 that are pivotally and slidably associated with one another to form a quasi-umbrella style arrangement. Furthermore, each of the rib elements 21 include a first rib element 22 having an inboard end pivotally connected to the outboard end 31 of the upper portion 32 of the collapsible shaft member 30. A second rib element 23 has an inboard end pivotally connected to the slidable collar element 40 on the upper portion 32 of the collapsible shaft member 30. The outboard end of the first rib element 22 is slidably disposed on the intermediate portion of the second rib element 23. A third rib element 24 having an inboard end pivotally and slidably connected to the intermediate portion of the first rib element 22 and a fourth rib element 25 whose inboard end is pivotally connected to the outboard end of the third rib element and having an intermediate portion which is pivotally connected to the outboard end of the second rib element 23.

As can be seen by reference to FIGS. 4 through 7, the collapsible support shaft member 30 is provided with a lower portion 33 that is pivotally connected as at 34 so that the support shaft member 30 will form a generally L-shaped support leg arrangement for the four armed framework member 20 when the framework member 20 is fully deployed.

In addition, both the framework member 20 and the support shaft member 30 are capable of being collapsed into a very compact configuration both for transport to and from the field, as well as for storage purposes.

Turning now to FIGS. 1 through 3, 6 and 7, it can be seen that the decoy/blind unit 12 comprises a decoy/blind member 50 that includes a generally rectangular sheet 51 of camouflage material 52. The rear surface 53 of the rectangular sheet 51 is provided with a plurality of pockets 54 which are dimensioned to receive the outboard ends of each of the support arms 21 of the collapsible framework member 20.

In addition, the decoy/blind member 50 further comprises a decoy element 55 that is provided on the front surface 56 of the rectangular sheet 51. In the first version of the preferred embodiment in FIG. 2, the decoy element 55 is fabricated from lightweight flexible foam rubber 57 or the like that will provide depth and contours to the decoy element 55. In the second version of the invention the decoy element 55 is fabricated from a thin sheet of opaque material 58. In both versions, the decoy element 55 has the outline, coloration and appearance of a selected species of wild game.

At this juncture, it should be noted that in the preferred embodiment of the invention, the decoy element 55 is opaque while the camouflage material 52 is at least semi-transparent to provide depth perception to an animal observing the decoy element 55. Furthermore, when the apparatus 10 is employed both as a blind and a decoy, this semi-transparency not only allows hunters hidden behind the apparatus 10 to observe an approaching animal, but also causes the animal to attribute any motion that occurs in an obscured fashion behind the decoy element to be animated movement caused by the decoy element 55. This feature is particularly helpful when a hunter begins to raise either a firearm or bow and arrow preparatory to taking a shot at an animal, and it also coincides exactly with that point in time when an animal would most likely be spooked by the movement, but for the presence of the decoy element 55.

It should also be noted that this invention also contemplates fabricating sheet 51 from transparent material in those instances where the apparatus 10 is only intended to function as a decoy and in this particular instance, the decoy element 55 will present a stand alone appearance with the background vegetation and landscape being clearly visible to the game animal.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A collapsible blind and decoy apparatus for attracting wild game wherein the apparatus comprises:
    a decoy/blind unit including a first sheet of transparent material having a front surface and a rear surface wherein said front surface is provided with a decoy element that resembles a selected species of wild game; and
    means for supporting the decoy/blind unit in a generally vertical orientation.

2. The apparatus as in claim 1 wherein said decoy element is opaque.

3. The apparatus as in claim 1 wherein the decoy element has the outline and coloration of a selected species of wild game.

4. The apparatus as in claim 1 wherein the decoy element comprises at least in part a second sheet of material having a variable thickness.

5. The apparatus as in claim 1 wherein said means for supporting the decoy/blind unit comprises a framework unit.

6. The apparatus as in claim 5 wherein the framework unit includes a collapsible framework member.

7. The apparatus as in claim 6 wherein the collapsible framework member includes a plurality of collapsible support arms.

8. The apparatus as in claim 7 wherein the first sheet of material is provided with a plurality of pockets dimensioned to receive a portion of at least some of the plurality of collapsible support arms.

9. The apparatus as in claim 8 wherein, plurality of pockets are formed on the rear surface of the first sheet of material.

10. The apparatus as in claim 7 wherein the framework unit includes a collapsible support shaft.

11. The apparatus as in claim 10 wherein the collapsible support shaft includes an upper portion having an outboard end and a lower portion which is pivotally connected to said upper portion.

12. The apparatus as in claim 11 wherein the collapsible support arms are pivotally associated at least in part with the outboard end of the upper portion of the collapsible support shaft.

13. The apparatus as in claim 12 wherein the upper portion of the collapsible support shaft is further provided with a slidable collar element.

14. The apparatus as in claim 13 wherein the collapsible support arms are pivotally associated at least in part with said slidable collar element.

15. The apparatus as in claim 14 wherein each of the collapsible support arms comprise a plurality of rib elements that are operatively associated with one another in selected pivotal and slidable fashion.

16. A collapsible blind and decoy apparatus for attracting wild game wherein the apparatus comprises:
    a decoy/blind unit including a first sheet of material having a front surface and a rear surface wherein said front surface is provided with a decoy element that comprises at least in part a second sheet of material having a variable thickness and which resembles a selected species of wild game; and,
    means for supporting the decoy/blind unit in a generally vertical orientation.

17. The apparatus as in claim 16 wherein said first sheet of material is opaque.

18. The apparatus as in claim 16 wherein the decoy element has the outline and coloration of a selected species of wild game.

19. The apparatus as in claim 16 wherein said first sheet of material is at least semi-transparent.

20. The apparatus as in claim 16 wherein said first sheet material is transparent.

* * * * *